(12) United States Patent
Ramsey et al.

(10) Patent No.: US 6,564,958 B1
(45) Date of Patent: May 20, 2003

(54) TAMPER EVIDENT CLOSURES

(75) Inventors: Christopher Paul Ramsey, Oxfordshire (GB); Philippe Odet, Chasselay (FR); Michael Barrie Simpson, Lancashire (GB); Peter Frank Woodward, Southmoor (GB); Donald E Griffiths, Paignton (GB); Robert McDonald Gillies, Grove (GB)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 0 days.

(21) Appl. No.: 09/868,985

(22) PCT Filed: Dec. 9, 1999

(86) PCT No.: PCT/GB99/04151

§ 371 (c)(1), (2), (4) Date: Jun. 22, 2001

(87) PCT Pub. No.: WO00/37329

PCT Pub. Date: Jun. 29, 2000

(30) Foreign Application Priority Data

Dec. 22, 1998 (GB) .............................................. 9828183

(51) Int. Cl.$^7$ ............................................. B65D 50/00
(52) U.S. Cl. ........................ 215/230; 215/235; 215/303
(58) Field of Search .............................. 215/228, 230, 215/235, 237, 250, 251, 303

(56) References Cited

U.S. PATENT DOCUMENTS

| | | | | |
|---|---|---|---|---|
| 3,698,585 A | * | 10/1972 | Smith et al. ................. | 215/220 |
| 3,731,849 A | * | 5/1973 | Burrows ................. | 222/153.06 |
| 4,487,324 A | * | 12/1984 | Ostrowsky ................... | 215/235 |
| 4,588,098 A | * | 5/1986 | Uzdy .......................... | 215/230 |
| 4,747,497 A | * | 5/1988 | Holman ....................... | 215/230 |
| 5,234,118 A | * | 8/1993 | Fillmore et al. ............ | 215/206 |
| 5,738,236 A | * | 4/1998 | Brun, Jr. ..................... | 220/253 |
| 5,762,215 A | * | 6/1998 | Ogden ......................... | 215/277 |
| 5,853,093 A | * | 12/1998 | Neiger ........................ | 215/237 |

* cited by examiner

Primary Examiner—Nathan J. Newhouse
(74) Attorney, Agent, or Firm—Diller, Ramik & Wight (57) ABSTRACT

A snap-on or screw type, tamper evident closure having first and second relatively moveable plastic parts (16, 18) which move from an initial position to a new limiting position when the closure is first opened, the new limiting position being visually distinguishable from the initial position to provide the tamper evidence. The two plastics parts are formed in mutually intimate association but have interengaging complimentary formations (22, 28, 40, 42) which become irreversibly disengaged on first opening of the closure.

19 Claims, 5 Drawing Sheets

TAMPER EVIDENT CLOSURES

BACKGROUND OF THE INVENTION

This invention relates to tamper evident closures for containers and in particular to tamper evident closures which undergo a permanent, visible change on first opening of the container.

Many forms of tamper evident closures for containers are known, made in plastics, metals or a combination of the two. Such closures have a part the condition and/or position of which indicates that the closure has been removed from the container, or at least an attempt to remove it from the container has been made.

Many of these closures have two parts which are formed separately and then assembled together after manufacture. However, closures of this kind tend to be relatively expensive, in particular because of the assembly operation. Also there is the possibility of tampering by separating the parts of the closure to overcome the tamper evidence.

It is also well known to provide a tamper evident closure with a portion which is partially or wholly severed from the remainder of the closure to provide the tamper evidence. Closures of this kind include those in which the free edge of the closure skirt is formed as a security ring which is attached to the remainder of the skirt by frangible bridges. The security ring breaks partially or wholly away from the closure at these bridges when the closure is first opened. A further kind of closure has relatively movable inner and outer shells, the outer shell of which has a portion formed in its crown or closure panel which is arranged to be partially or wholly severed when the shells are moved axially in relation to one another. A closure of this latter kind is disclosed in U.S. Pat. No. 4,527,701.

U.S. Pat. No. 5,738,231 discloses a threaded tamper indicating closure which provides an indication of initial opening by how far the closure threads onto a container neck.

However, the tamper evident closures discussed in the previous paragraphs have several disadvantages. For example, they may be environmentally unsatisfactory and are often unsightly and/or uncomfortable to use after they have been opened for the first time. They may also require modification of the container to which they are to be fitted. Furthermore, it may be possible for a tamperer to overcome the tamper evidence by opening the closure, breaking the frangible portion, and then reinstating the closure on the container in a substantially undetectable manner.

A plastics moulding technique which has been used to a limited extent in the manufacture of packaging components is commonly referred to as "sequential moulding". In this process a plastics pre-article or "preform" is first moulded by introducing hot, possibly molten, polymer into a correspondingly shaped (and appropriately dimensioned) cavity defined by a mould, causing the polymer to conform to the mould cavity and thereafter allowing the polymer to cool and solidify. The mould cavity is then opened, leaving the preform still held on a part of the mould, and that mould part and the attached preform is used to create a new mould cavity in which the preform forms a part of the defining wall. A second hot polymer, which may differ from the first, is then introduced into and conformed to the new mould cavity, so that after cooling an article having two intimately associated parts is formed. The article is subsequently ejected, possibly after one or more additional sequential moulding operations have been performed upon it. Usually, the moulding operations are each performed by injection-moulding, with molten polymer introduced into the mould cavity at high pressure, or by compression moulding, with the second part being moulded into the shell of the preform.

SUMMARY OF THE INVENTION

The present invention is based on the realisation by the Applicants that, especially by the use of sequential moulding, a tamper evident closure can be produced from which some or all of the disadvantages of the known closures recited above are eliminated, to at least a significant degree.

Accordingly, the invention provides a tamper-evident closure for a container, comprising first and second plastics parts adapted to move relative to one another from an initial position to a new limiting position which is visually distinguishable from the initial position, characterised in that at least a portion of the first and second plastics parts have complimentary formations including a re-entrant section, and in the initial position the plastics parts are moulded in mutually intimate association by sequential moulding and, on first opening of the closure, the complimentary formations are adapted to disengage and thereafter cannot be re-engaged. An advantage of sequentially moulding the first and second plastic parts is that they may be provided with complimentary formations which are intimately inter-engaged in the as-moulded position, but which become disengaged, and are difficult or impossible to re-engage, once the two parts are separated for the first time. The difficulty in re-engaging the complimentary formations is enhanced by selecting a suitable shape for the complimentary formations. The invention has application to tamper evident screw and snap-on closures of the kind which are removed when it is desired to dispense product from the container. Such a closure may comprise the first and second plastic parts as relatively inner and outer closure parts respectively.

The closure may further include an outermost, metal part within which the inner and outer closure parts are disposed. Preferably, in the manufacture of such a closure the outer closure part is formed directly within the metal part by insert moulding, the inner closure part being subsequently formed by sequential moulding within the outer closure part. Alternatively, the inner and outer parts may be formed as a discrete component which is subsequently bonded and/or mechanically secured in the metal part.

"Insert moulding", as referred to in the previous paragraph, is a form of moulding in which an article is placed into a mould as an insert, to define part of the wall of the mould cavity, hot polymer is introduced into and conformed to the mould cavity and then caused to cool and solidify. In the composite article so produced the moulded polymer is in intimate association with the insert, and may be strongly bonded to it at the interface between them.

The invention may also be applied to dispensing closures, that is to say closures which are held captive on the container and arranged to dispense product through a dispensing orifice which is opened and closed by relative movement between the two parts of the closure. Usually such closures have a first, body part which is attached to the container by screw or snap-on engagement. The second part is provided as a lid, which co-operates with a dispensing orifice in the body part and is usually hinged to the body part of the closure. In known closures of this type, the lid and body parts may be moulded as a single piece, with the lid and body parts connected together by a film hinge.

An advantage of using sequential moulding to form such hinged dispensing closures is that the film hinge may be replaced by a mechanical hinge, without the addition of the assembly operation usually inherent with use of this type of hinge. Mechanical hinges have the advantage that they are generally more robust than film hinges and thus are less likely to break. For example, the pin of the hinge may be moulded integrally with the first, body part of the closure. The lid may then be sequentially moulded with the sleeve portion of the hinge moulded integrally with the lid.

Use of sequential moulding to form a dispensing closure also has the advantage that different materials may be used for the body of the closure and the lid. This allows the lid to be made from a softer, more flexible material, which in turn helps the sealing performance of the closure where the lid co-operates with the dispensing orifice. Such softer materials are unsuitable for making a film hinge as they break too easily.

Alternatively, the outer part of the closure may be made from a harder material to provide abuse and scuff resistance and the inner part of the closure may be made from a softer material to provide a good seal both against the body and the lid.

This technique is particularly useful for forming a closure on a tube, such as a toothpaste tube for example. The ability to use two different materials means that the body of the closure may be made from polyethylene so that it can bond to the tube, whilst the lid may be provided in polypropylene to provide a robust mechanical hinge.

Several tamper evident closures embodying the invention will now be described, by way of example, with reference to the accompanying drawings, in which:

DESCRIPTION OF THE PREFERRED EMBODIMENTS

Figure 1:
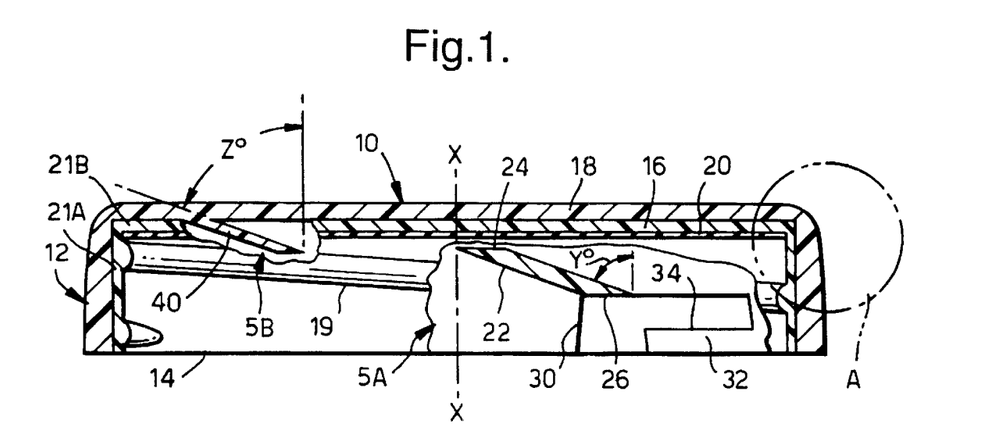
FIG. 1 shows a cross section view of a first removeable closure in the as-moulded condition.
Figure 2:
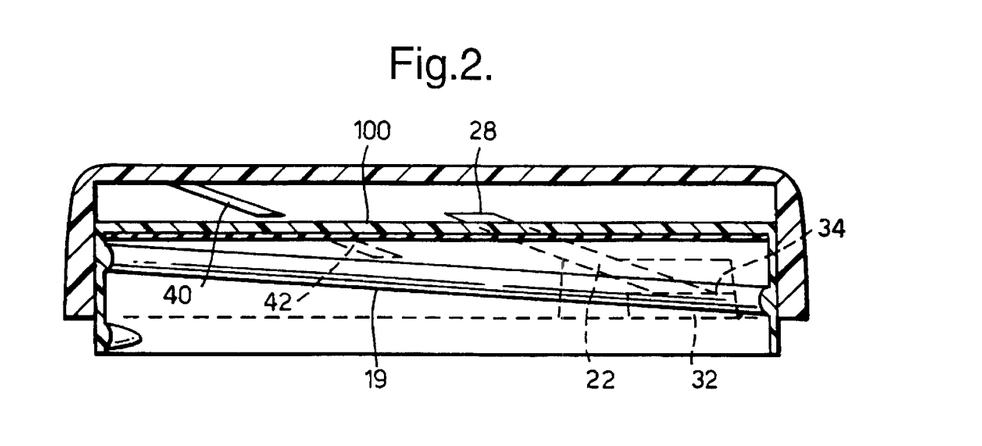
FIG. 2 shows a cross section view of the first closure after it has been unscrewed from the container neck.

Referring firstly to FIGS. 1 and 2, a screw closure for closing the neck of a glass or plastics container (not shown) has a generally plane closure panel or crown 10, and a depending peripheral skirt 12 which extends to the free edge 14 of the closure. The closure is made of plastics material, and has inner and outer parts 16, 18 which are coextensive so as each to provide respective parts of the closure panel and the skirt.

A single-start, helical screw thread 19 is formed on the inner surface of the skirt of the inner closure part 16 for engagement with a complementary formation on the container neck to attach the closure releasably to the container in well known manner. When in its fully engaged position the closure forms an hermetic seal with the container neck by means of a sealing medium 20 which is positioned against the underside of the closure panel of the inner closure part. The sealing medium may be formed in situ by a moulding operation, for example by sequential moulding or as a flowed-in compound, or it may be in the form of a preformed wad which is located in position after the closure has been moulded. As a further possible alternative the sealing medium may be a flexible, downwardly extending sealing ring which is integrally moulded on the underside of the closure panel of the inner closure part.

The inner and outer closure parts 16, 18 may be formed from differing thermoplastic polymeric materials by sequential moulding. The outer part is first injection-moulded in a conventional manner, by injecting a first polymer at high pressure into a mould cavity. After the moulding has cooled and solidified the mould core, that is to say, the part of the mould which defines the interior surface of the cavity, it is substituted by a further mould core. With the interior surface of the outer part this further mould core defines a new mould cavity of corresponding shape and appropriate dimensions to the inner closure part. A second molten polymer which may differ from the first is then injected into this new mould cavity and allowed to cool and solidify to form the inner closure part, after which the composite article is ejected from the mould. For the purposes of the following description the generally cylindrical part of the interface 21 of the two parts 16, 18 which lies between their skirts is denoted 21A, the generally plane part of the interface lying-between the closure panels of the parts being denoted 21B.

Figure 5A:
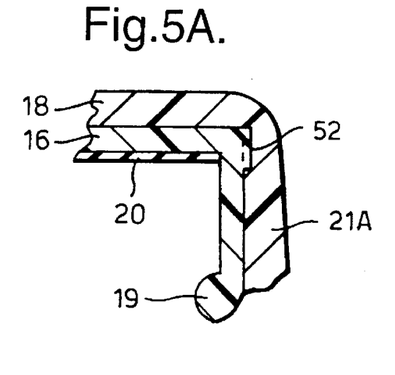
FIGS. 5A and 5B are enlarged scrap views of the portion A ringed in FIG. 1 and show a modification of the closure of FIGS. 1 and 2, respectively before and after differential shrinkage has occurred between the closure parts.

In FIG. 1 the regions of the closure which are denoted 5A, 5B are shown in section taken at the cylindrical interface 21A to reveal internal detail of the closure. From these scrap sectional views it will be understood that the closure as moulded has two sets of formations by which the inner and outer closure parts 16, 18 are engaged with one another. As shown in the sectional view 5A, in a first set of these formations an inclined, outwardly projecting, substantially rigid rib 22 is moulded on the outer surface of the inner closure part. The rib is elongate and in the form of a portion of a helix. Its top and bottom ends 24, 26 respectively are directed transversely of the closure, i.e. perpendicularly to the closure axis XX. It will particularly be seen that the helix angle Y° of the rib, that is to say, its angle in relation to an axially directed radial plane which intersects it, is considerably less than the helix angle of the screw thread 19.

The rib 22 has a depth radially of the closure such that it penetrates through part, but not all, of the wall thickness of the outer closure part in its locality. Except at its bottom end 26 it is received in a correspondingly shaped, inwardly facing groove 28 (FIG. 2) which is formed in the outer closure part by the sequential moulding operation. Because of this method of formation the rib 22 and groove 28 are in close dimensional conformity with one another and make intimate contact at the interface between them.

At the bottom end of the rib 22 the groove 28 is extended in both the circumferential and radial senses within the skirt of the outer closure part as an enlargement 30. As will be understood from the drawings, this enlargement of the groove is generally rectangular as seen looking radially of the closure, its major side being directed circumferentially. It is open to the free edge 14 of the closure over a part of its length, but over the remainder of its length it is closed by a rectangular stop 32 formed where the skirt of the outer closure has its normal wall thickness. it will particularly be noted that the stop is located in alignment with the groove 28, so as to present its transversely extending upper surface 34 for engagement by the bottom end 26 of the rib 22.

Although not shown in the drawings it should be understood that the arrangement of rib 22, complementary groove 28, groove enlargement 30 and stop 32 is repeated on the diametrically opposite side of the closure to the arrangement shown. Thus, two of the first sets of interengaging formations are provided.

Figure 5B:
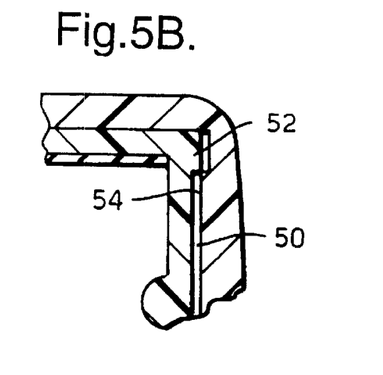

A second set of formations at which the closure parts 16, 18 engage one another is shown in the sectioned area 5B. A thin and flexible rib 40 of helical form is moulded on the outer closure part as a downwardly and inwardly extending projection of that closure part at the interface of the closure parts where the closure panel 10 and skirt 12 meet. The rib 40 has a helix angle Z° which is of similar magnitude to, but differs slightly from, the helix angle Y° of the rib 22. The closure shown in FIGS. 1 and 2 is about 6 cm in diameter and about 1 cm high; its rib 40 is about 0.75 mm wide, 9 mm long and 0.6 mm deep (radial depth), and its helix angles Y° and Z° are about 70° and 72° respectively.

The rib 40 is received in a complimentary groove 42 (FIG. 2) formed in the skirt of the inner closure part. In the same manner as the formation of the rib 22 within its groove 28, by virtue of the sequential moulding operation by which the closure is formed the rib 40 and groove 42 are in close dimensional conformity and make intimate contact with one another at the interface between them.

Although only one rib 40 and complimentary groove 42 are shown in the drawings, it is to be understood that a plurality of sets of formations 40, 42 are provided, at a regular spacing around the closure. In the described embodiment four such sets of formations are provided.

The closure as moulded is as shown in FIG. 1, and in that condition is supplied to a food packer for screw-on application to a product-filled container in the normal way. Because the inner closure part 16 is inaccessible, in order to unscrew the closure for the first time the user (whether bona fide or otherwise) must turn the outer closure part in a counterclockwise direction as for a conventional screw closure. However, the plastics materials of which the inner and outer closure parts 16, 18 are formed are incompatible to such an extent that the bond formed between them at the interfaces 21A, 21B is weak or non-existent. The torque required to turn the inner closure part on the container neck is therefore greater than the torque which is required to break any bond between the closure parts and so allow the closure parts to turn relatively in relation to one another. If required, the polymeric materials of one or both of the closure parts may be modified, for example by the addition of a release agent, so as to achieve a required quality of bond between them.

Thus the unscrewing motion of the user initially causes the closure parts to turn in relation to one another, the ribs 22 moving along their complementary grooves 28 and causing the outer closure part to rise by cam action on the inner closure part (and the container). This relative rotational and axial movement of the closure parts continues until the bottom ends of the ribs 22 engage the upper surfaces 34 of the stops 32 to prevent further relative movement. Continued rotation of the outer closure part in the anticlockwise direction then rotates the inner closure part in the normal way until the thread 19 is disengaged from the complementary thread on the container and the closure can therefore be removed.

The relative movement of the closure parts described in the previous paragraph draws the ribs 40 along their complementary grooves 42. The length of the ribs 40 is such that they are disengaged from the grooves 42 before the ribs 22 come into engagement with the stops 32. The condition of the closure at this time is depicted in FIG. 2.

As can be understood from FIG. 2, by virtue of the different helix angles of the ribs 22 and 40, the rib 40, after disengagement from its groove 42, adopts a position in which it is no longer aligned with that groove. Thus, when the closure is later screwed back onto the container by turning the outer closure part in the clockwise direction, the rib 40 fails to enter the groove 42 and instead becomes compressed and distorted against the free upper surface 100 (FIG. 2) of the inner closure part. Accordingly, even though the closure may successfully reseal the container, the outer closure part is held by the rib 40 in a partially raised position on the inner closure part and the part of the skirt of the inner closure part which is still visible provides a clear visual indication that the closure has been removed and later replaced.

The withdrawal of the rib 40 from the groove 42 as described above is accompanied by distortion of the rib to accommodate the difference in the helix angles Y° and Z°. The rib should accordingly have a substantial degree of flexibility, and its cross-sectional dimensions are selected for that purpose. Whilst the rib 40 is shown and described as being of pure helical form, other types of formation are possible.

Figure 3:
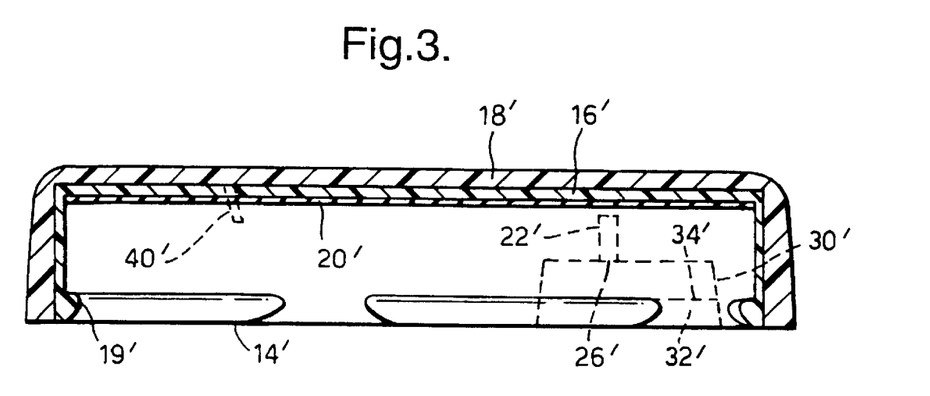
FIG. 3 is a view corresponding to FIG. 1 of a second removeable closure according to the invention.
Figure 4:
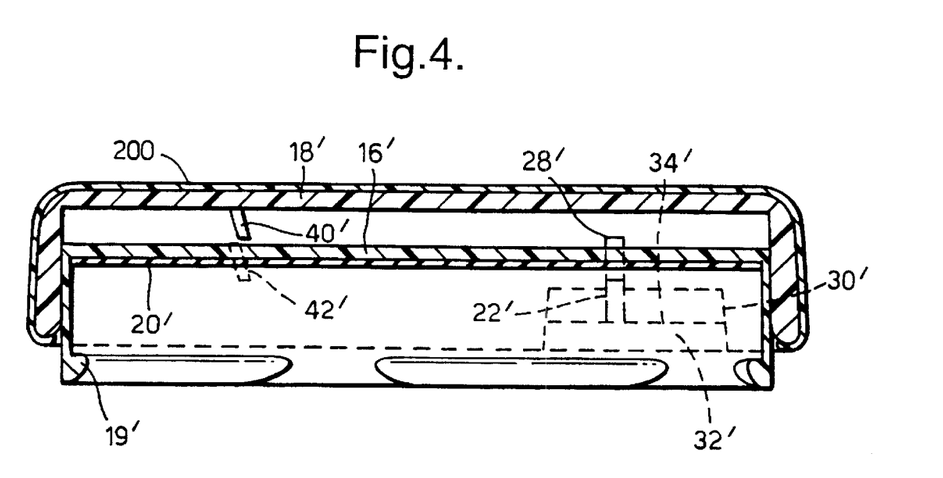
FIG. 4 is a view corresponding to FIG. 2 of the second closure.

A second closure embodying the invention is shown in FIGS. 3 and 4, which show the as-moulded and operated conditions of the closure respectively. Like the first closure, the second closure is made by sequential moulding using incompatible and preferably differently coloured thermoplastics materials. Moreover, the closure arrangement is essentially as before, and the same reference numerals with primes are used to indicate corresponding features.

The two closures differ in that the closure of FIGS. 1 and 2 is a screw closure whereas that of FIGS. 3 and 4 is a snap-on closure, that is, it may be fitted to, and removed from, the container by purely axial movement. For that purpose the screw thread 19 of the closure of FIGS. 1 and 2 is replaced by a preferably discontinuous bead 19' which projects inwardly from the inner closure part 16' adjacent its free edge 14'.

The second closure has ribs 22' with complimentary grooves 28', and ribs 40' with complementary grooves 42', which essentially perform the same function as the corresponding items of the first closure.

The second closure is adapted for snap-on operation by selection of the helix angles of the formations, and it will be seen that the helix angle of the ribs 22', which essentially determine the relative movement available between the closure parts, is zero (0°), that is to say, the ribs 22' are directed axially of the closure, with no angular component. The helix angle of the ribs 40' is 2°. This angle is small, but sufficient to ensure that once the ribs 40' have been withdrawn from their associated grooves 42', they cannot re-enter the grooves when the closure is refitted to the container.

In the moulding of the closures of FIGS. 1, 2 and 3, 4 the enlargements 30, 30' provide access for parts of the injection-moulding tooling by which the bottom ends 26, 26' of the ribs 22, 22' and the top faces 34, 34' of the stops 32, 32' are defined and formed.

FIG. 4 is used to illustrate a variation of the invention in which the closure is moulded inside a metal outer shell 200. In the manufacture of the closure the outer closure part 18' is first formed within the shell by insert-moulding, the inner part 16' being subsequently formed within the outer part by sequential-moulding as before. This modification, which may also be used for the closure of FIGS. 1 and 2, can provide additional rigidity and aesthetic benefit for the closure; it can also prevent the possibility that a potential tamperer may be able to remove the closure from the container when still in its as-moulded condition, by compressing the outer closure part tightly against the inner closure part during the unscrewing operation. Instead of insert-moulding the outer closure part into the shell, the closure parts may alternatively be moulded to form a discrete component by sequential-moulding, this component being subsequently bonded and/or mechanically secured in the shell.

A further modification, which may also be used for both closures, is illustrated in FIGS. 5A and 5B in relation to the closure of FIGS. 1 and 2. The modification is used in closures where differential shrinkage of the closure parts, in particular greater shrinkage of the inner part 16 in relation to the outer part 18, will create a gap 50 (FIG. 5B) between the opposed surfaces of the skirts. This gap, although small, may be sufficient to allow a looseness of movement of the closure parts in relation to one another, and a resulting unsatisfactory operation of the closure.

In order to remove or substantially reduce such looseness, the radius on which the interface 21A lies is locally increased at several suitable locations which are free of the formations 22, 28, 30, 32 and 40, 42, by a distance which is the same as, or preferably slightly less than, the gap which is expected to result from the differential shrinkage. The inner closure part 16 accordingly has a plurality of raised areas which initially are located in complementary areas of the outer closure part 18. These areas may be of any suitable shape, one such area being the rectangular land 52 shown.

As shown in FIG. 5B, after the inner closure part has been moulded and the closure has subsequently cooled, the raised areas of the inner closure part (e.g. the land 52) will adopt a position which is aligned with, or preferably slightly proud of, the surrounding surfaces 54 of the inner closure part. When the closure is operated and the closure parts move rotationally and axially in relation to one another, the raised areas will therefore move into renewed contact with the outer closure part at its surfaces 54 so as to prevent or reduce the looseness mentioned above.

Whilst in the described embodiments the ribs 40 and their complementary grooves 42 are formed within the skirt 12 at its intersection with the closure panel 10, it would alternatively be possible to locate formations which are functionally equivalent to the formations 40, 42 wholly within the closure panel.

FIGS. 6 to 9 illustrate an application of the invention to a screw threaded dispensing closure 60 having a body portion 62 and a hinged lid 64. The hinge pin 82 is formed integrally with the body portion 62 of the closure and the surrounding sleeve 84 of the hinge is formed integrally with the lid 64.

Figure 6:
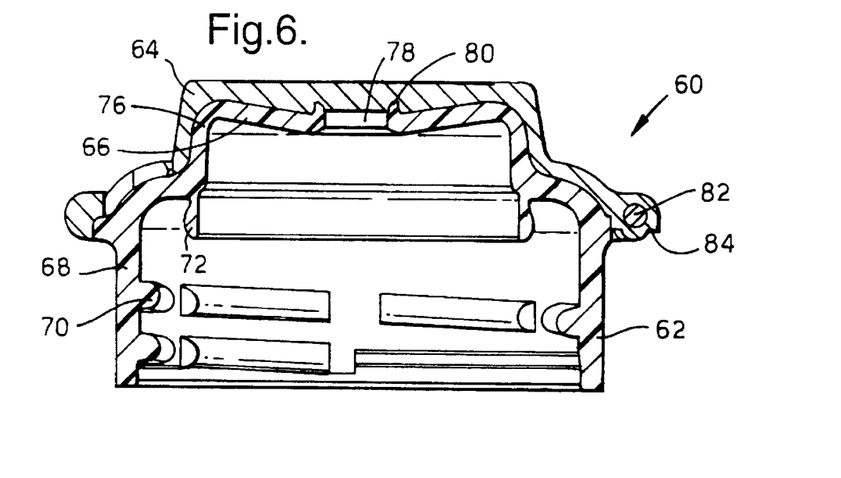
FIG. 6 shows a cross section view of a hinged dispensing closure in the as-moulded condition.
Figure 7:
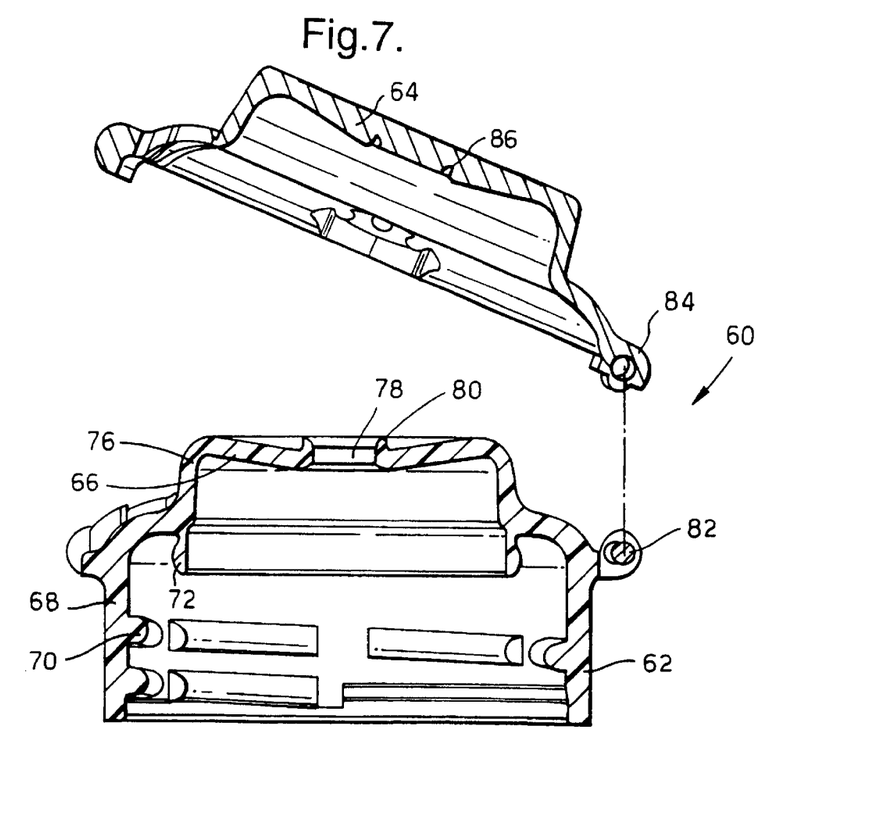
FIG. 7 shows an exploded cross section view of the closure according to fig.6 with the lid and body portions separated to more clearly show the features of each.
Figure 8:
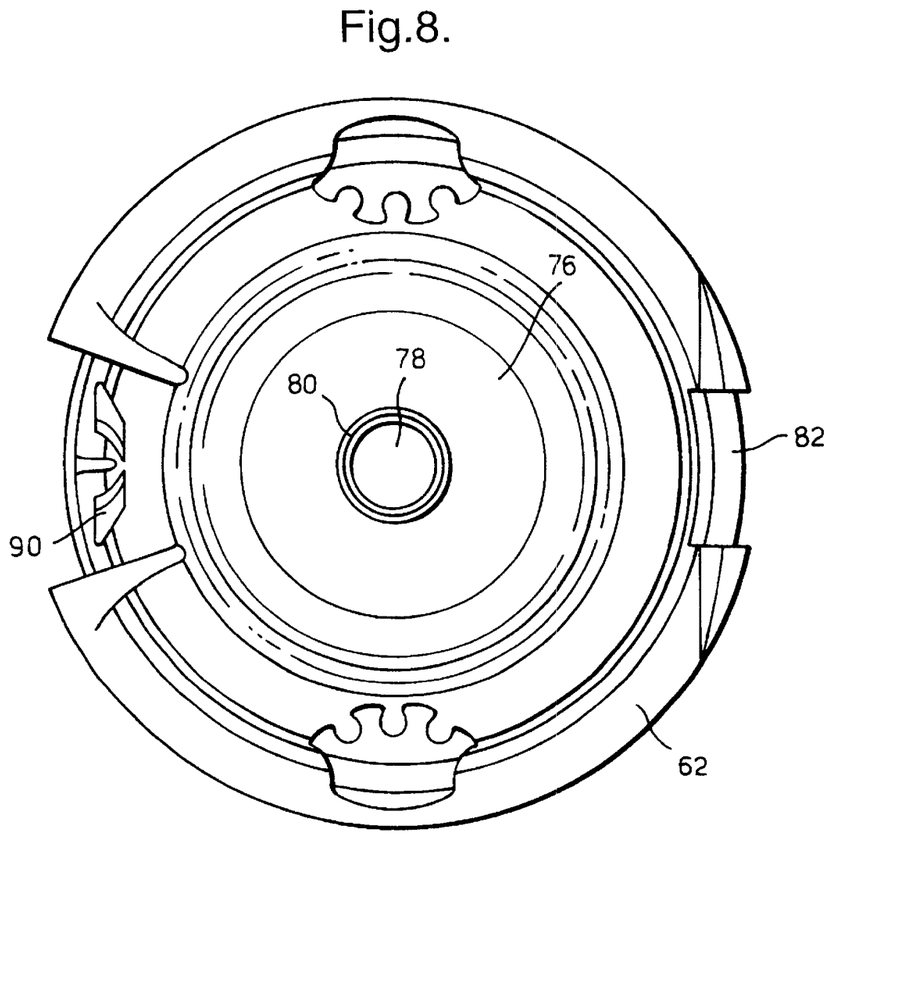
FIG. 8 shows a plan view of the body portion of the closure shown in FIGS. 6 and 7 (with the lid removed to show the pin portion of the hinge).

The body portion 62 has a closure panel or crown 66 and a depending skirt 68 which is formed internally with a screw thread 70 for attachment to a complimentary thread on a container (not shown). On its undersurface, the closure panel 66 carries a bore seal 72 for sealing engagement with the internal surface of the neck of the container. A boss 76, forming part of the closure panel 66 projects upwardly above the seal 72. A dispensing orifice 78 is formed in the centre of the upstanding boss 76, the dispensing orifice having a raised pouring lip 80. Preferably, as shown, the boss 76 has the form of a frustocone, extending inwardly in the direction of the pouring lip 80. This frustoconical shape assists in separating the lid 64 from the body portion 62 when the closure is first opened.

The body portion 62 and lid 64 of the closure are preferably formed from differing thermoplastic polymeric materials by sequential moulding. The body portion 62 is first injection moulded in a conventional manner, by injecting a first polymer at high pressure into a mould cavity. After the moulding has cooled and solidified, the upper surface of the mould, that is to say the part of the mould defining the external surface of the body, is substituted with a new mould part which defines the external surface of the lid 64. The moulding is retained on the mould core, defining the internal features of the body portion 62. The part of the mould cavity used to define the underside of the hinge pin 82 is moveable independently of mould core and is lowered to provide, together with the new mould part, a mould cavity which entirely surrounds the hinge pin 82. The hinge portion of the mould cavity defines the hinge sleeve 84 which surrounds the hinge pin 82. A second molten polymer, which may differ from the first, is then injected into the new mould cavity and allowed to cool and solidify to form the lid 64 and hinge sleeve 84.

As the lid 64 is sequentially moulded around the body portion 62, the lid is provided with an indent 86 which co-operates intimately with the poring lip 80. Preferably, the second polymer, used for the lid, is softer and more flexible than the polymer used for the base portion. This ensures better sealing between the lid 64, the upstanding boss 76, the raised lip 80 of the dispensing orifice 78 and the co-operating indent 86.

Figure 9A:
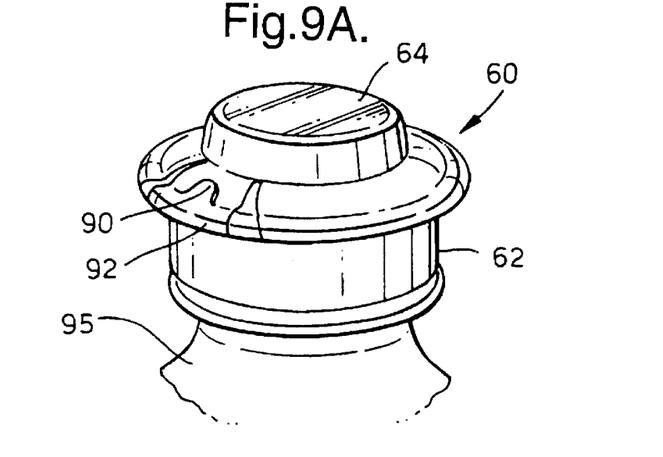
FIGS. 9A to C show isometric views of the hinged closure of FIGS. 6 to 8, in the as-moulded condition, opened condition and re-closed condition respectively.
Figure 9B:
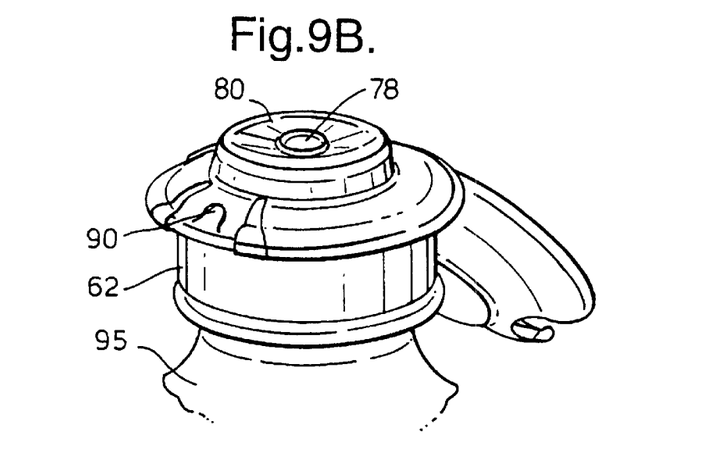
Figure 9C:
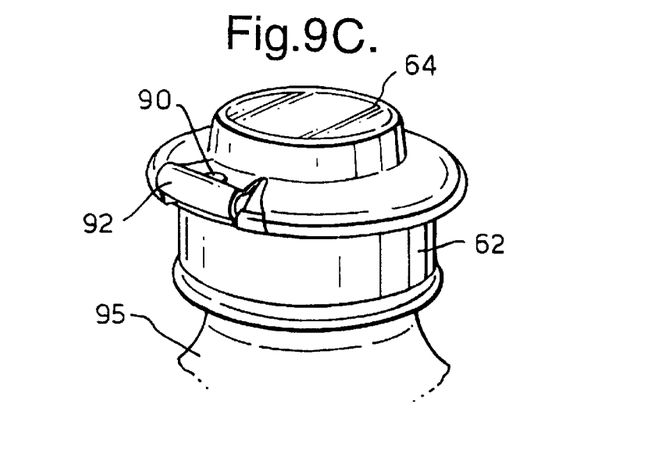

As shown in FIG. 9, the hinge pin 82 preferably follows the circular contour of the body portion 62, as opposed to being a straight section. This arrangement ensures that the second polymer used to mould the lid and hinge sleeve portion (not shown in FIG. 9) can flow evenly around the hinge pin during the second stage of the moulding process, because the geometry of the cavity has a uniform cross sectional thickness. The curved hinge pin 82 has the additional benefit of producing a snap action to the hinge. Furthermore, by modification of the contour of the external surface of the hinge sleeve 84 (see FIG. 6), the hinge may be provided as a click hinge with a number of stable positions, separated by regions of instability.

A number of complimentary formations 90 which are intimately inter-engaged in the as-moulded position are provided on the body portion 62 and lid 64 of the closure 60 (as shown in FIGS. 8 and 9A to 9C). The formations 90 in the body portion 62 and lid 64 of the closure are shaped such that when they are disengaged, on first opening of the container, they are difficult or impossible to re-engage.

As shown in FIG. 9A, the closure 60 is attached to a container 95 in its as-moulded configuration. The formations 90 on the body portion 62 and the lid 64 are intimately engaged. Although the closure 60 has been described as having a screw threaded engagement with the container 95, it will readily be appreciated that the closure may be engaged on the container neck by a suitable snap fit engagement.

In order to open the closure for the first time, the tab 92 on the lid 64 is lifted and the formations 90 on the body portion 62 and the lid 64 are disengaged. The tab 92 may then be used to prise the lid 64 from the body portion 62. As shown in FIG. 9B, the formations 90 on the body portion 62 are finger like, re-entrant projections. Due to their re-entrant shape, these projections will not re-align with the complimentary slots in the lid 64 when it is re-closed onto the body. Finger like projections are preferred as they can straighten slightly to allow demoulding of the body part of the closure. The projections can also flex slightly when the lid is opened, allowing them to disengage with their complimentary slots in the lid. It will be appreciated that this arrangement would not be possible if the lid and body portions of the closure where made as two independent mouldings which are subsequently assembled.

Finally, as shown in FIG. 9C, when the lid 64 is re-closed, it co-operates tightly with the body portion 62, except in the region of the tab 92 where the upwardly projecting formations 90 on the body portion, prevent the tab from closing fully. The raised tab 92 provides visible tamper evidence, indicating that the closure has been opened whilst the remainder of the lid 64 ensures that the dispensing orifice 78 can be resealed. The boss 76 ensures that the raised tab 92 does not stand proud of the top of the closure, thereby reducing the chances of the tab 92 being caught or snagged once the tamper evidence has been activated.

Whilst injection-moulding is described above as being the moulding method used for the closure parts, if desired one or both of the closure parts may be moulded by the compression-moulding of polymer which is introduced into the mould and distributed within the mould cavity by a plunger.

Advantageously, the visual distinction between the as-moulded and operated conditions of the closure (i.e. as FIGS. 1 and 2 or FIGS. 9A and 9C) is enhanced by moulding the two closure parts from plastics materials having different colours, although other methods of achieving the same objective are possible. For example, the two parts of the closure may be made from the same colour material with the finger-like projections being arranged to form a textual message. Initially, when the inter-engaged projections are intimately engaged, the text will not be apparent as the surface of the projections will appear to form part of the top surface of the closure. However, once the projections are disengaged, the text will become readily apparent due to the exposed textual message.

It will be appreciated that in certain arrangements, the finger-like projections do not need to extend through the complimentary formations on the tab, for example, but may be provided so that they end in blind slots within the tab. In this arrangement, once the finger-like projections are disengaged from their complimentary formations, the tab will be held in a raised position providing the necessary tamper evidence but slots will not appear in the upper surface of the tab.

In another alternative arrangement, instead of having a re-entrant section, the inter-engaged formations may be provided as a complicated pattern of features which rely on the material shrinkage to prevent the features from being re-engaged after initial opening.

Although a preferred embodiment of the invention has been specifically illustrated and described herein, it is to be understood that minor variations may be made in the apparatus without departing from the spirit and scope of the invention, as defined the appended claims.

What is claimed is:

1. A tamper-evident closure for a container, comprising first (16) and second (18) plastics parts adapted to move relative to one another from an initial position to a new limiting position which is visually distinguishable from the initial position, at least a portion of the first and second plastics parts (16, 18) have complimentary formations (22, 28, 40, 42) including a re-entrant angle section projecting circumferentially inward, in the initial position the plastics part (16, 18) are molded in substantially mirror-like mutually intimate association by sequential moulding, and on first opening the closure the complimentary formations (22, 28, 40, 42) disengage and thereafter cannot be re-engaged.

2. A closure according to claim 1, wherein the complimentary formations (22,28,40,42) on at least one of the plastic parts are adapted to be resiliently deformed as the formations are disengaged.

3. A closure according to claim 2, wherein the plastics parts have at least one first set (22, 28) and at least one second set 40, 42) of inter-engaged formations, the one or more first sets of formations (22, 28) defining the relative movement of the plastic parts to the new limiting position, and the one or more second sets of formations (40, 42) being irreversibly disengaged on such relative movement.

4. A closure according to claim 1, wherein the plastics parts have at least one first set (22, 28) and at least one second set (40, 42) of inter-engaged formations, the one or more first sets of formations (22, 28) defining the relative movement of the plastic parts to the new limiting position, and the one or more second sets of formations (40, 42) being irreversibly disengaged on such relative movement.

5. A closure according to claim 4, which is a screw closure, the one or more first sets of formations (22,28) including a pair of complimentary helical formations.

6. A closure according to claim 4, which is a snap-on closure, the one or more first sets of formations including a pair of complimentary, axially directed formations.

7. A closure according to claim 1, further comprising a metal part (200) within which the plastics closure parts (16, 18) are disposed.

8. A closure according to claim 7, wherein the plastics parts (16, 18) are formed as a discrete component and the component is subsequently bonded and/or mechanically secured within the metal part (200).

9. A closure according to claim 7, wherein the plastics parts are moulded sequentially into the metal part (200).

10. A closure according to claim 1, wherein the first and second plastics parts provide the body portion (62) and lid (64) of a dispensing closure.

11. A closure according to claim 10, wherein the lid (64) includes a tab (92), arranged to be raised independently of the remainder of the lid, and the complimentary formations (90) are arranged so that the irreversible disengagement of the formations prevents reclosing of the tab.

12. A closure according to claim 10, wherein the lid (64) is connected to the body portion (62) by a sequentially moulded mechanical hinge (82).

13. A closure according to claim 12, wherein the lid (64) includes a tab (92), arranged to be raised independently of the remainder of the lid, and the complimentary formations (90) are arranged so that the irreversible disengagement of the formations prevents reclosing of the tab.

14. A closure according to claim 1, wherein the first and second plastic parts are made from different plastics materials.

15. A closure according to claim 1, wherein at least one of the plastics parts is formed by injection moulding.

16. A closure according to claim 1, wherein at least one of the plastics parts is formed by compression molding.

17. The closure according to claim 1, wherein the first (16) and second (18) plastic parts each include contiguous end panels and peripheral skirts, and said complimentary formations are moulded in opposing circumferential surfaces of said peripheral skirts.

18. The closure according to claim 1, wherein the re-entrant angle section and a plane through a closure panel of at least one of said first and second plastics parts set-off an included acute angle.

19. The closure according to claim 18, wherein the first (16) and second (18) plastic parts each include contiguous end panels and peripheral skirts, and said complimentary formations are moulded in opposing circumferential surfaces of said peripheral skirts.

* * * * *